United States Patent
Seo et al.

(10) Patent No.: US 9,836,224 B2
(45) Date of Patent: Dec. 5, 2017

(54) STORAGE CONTROLLER, STORAGE SYSTEM AND METHOD OF OPERATING STORAGE CONTROLLER

(71) Applicants: Jung-Min Seo, Seongnam-si (KR); Ju-Pyung Lee, Suwon-si (KR)

(72) Inventors: Jung-Min Seo, Seongnam-si (KR); Ju-Pyung Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 118 days.

(21) Appl. No.: 14/683,265

(22) Filed: Apr. 10, 2015

(65) Prior Publication Data

US 2015/0301749 A1  Oct. 22, 2015

(30) Foreign Application Priority Data

Apr. 21, 2014 (KR) .................. 10-2014-0047443

(51) Int. Cl.
*G06F 12/16* (2006.01)
*G06F 3/06* (2006.01)
*G06F 11/10* (2006.01)

(52) U.S. Cl.
CPC .......... *G06F 3/0611* (2013.01); *G06F 3/0619* (2013.01); *G06F 3/0635* (2013.01); *G06F 3/0689* (2013.01); *G06F 11/1076* (2013.01); *G06F 2003/0692* (2013.01); *G06F 2211/109* (2013.01)

(58) Field of Classification Search
CPC ................ G06F 11/2094; G06F 2211/1028
USPC ........................................ 714/6.22
See application file for complete search history.

(56) References Cited

U.S. PATENT DOCUMENTS

| | | | |
|---|---|---|---|
| 5,787,459 | A | 7/1998 | Stallmo et al. |
| 6,134,630 | A | 10/2000 | McDonald et al. |
| 6,976,189 | B1 * | 12/2005 | Schoenthal et al. ............ G06F 11/3672 714/41 |
| 8,090,909 | B2 | 1/2012 | Galloway et al. |
| 8,358,524 | B1 | 1/2013 | Pruthi |

(Continued)

FOREIGN PATENT DOCUMENTS

| | | |
|---|---|---|
| EP | 1389755 A2 | 2/2004 |
| JP | 2003158526 | 5/2003 |

(Continued)

OTHER PUBLICATIONS

European Search Report in Corresponding EP Application No. EP15164463 dated Aug. 27, 2015.

*Primary Examiner* — Chae Ko
(74) *Attorney, Agent, or Firm* — Volentine & Whitt, PLLC

(57) ABSTRACT

A redundant array of independent disks (RAID) storage system, includes a RAID master controller receiving a RAID request selectively communicating the RAID request to one of a plurality of storage devices, wherein first and second storage devices are directly connected outside a data communication path including the host among the storage devices. The first storage device determines upon receiving the RAID request whether distribution of a RAID sub-request to the second storage device is necessary, such that upon determining that the distribution of a RAID sub-request is necessary, the first RAID controller communicates the RAID sub-request to the second storage device via the direct network connection.

20 Claims, 15 Drawing Sheets

(56) References Cited

U.S. PATENT DOCUMENTS

| | | |
|---|---|---|
| 8,495,468 B2 | 7/2013 | Dachiku |
| 8,578,127 B2 | 11/2013 | Thatcher et al. |
| 8,601,211 B2 | 12/2013 | Flynn et al. |
| 8,601,222 B2 | 12/2013 | Flynn et al. |
| 8,607,092 B2 | 12/2013 | Tashima |
| 8,706,968 B2 | 4/2014 | Flynn |
| 8,719,501 B2 | 5/2014 | Flynn et al. |
| 8,725,934 B2 | 5/2014 | Batwara et al. |
| 8,756,375 B2 | 6/2014 | Flynn |
| 8,762,658 B2 | 6/2014 | Flynn et al. |
| 2005/0262390 A1 | 11/2005 | Okamoto et al. |
| 2007/0214313 A1* | 9/2007 | Kalos et al. ........ G06F 11/2069 711/114 |
| 2010/0211737 A1* | 8/2010 | Flynn et al. .......... G06F 3/0616 711/114 |
| 2011/0145452 A1 | 6/2011 | Schilling et al. |
| 2011/0167216 A1* | 7/2011 | Huang et al. ....... G06F 11/1076 711/114 |
| 2011/0246716 A1* | 10/2011 | Frame et al. ......... G06F 3/0689 711/114 |
| 2012/0239856 A1* | 9/2012 | Cho .................... G06F 11/1441 711/103 |
| 2013/0006684 A1 | 1/2013 | Carter |
| 2013/0060989 A1* | 3/2013 | Aune .................. G06F 12/0246 711/103 |
| 2013/0086336 A1* | 4/2013 | Canepa et al. .......... G06F 12/00 711/154 |
| 2013/0173956 A1 | 7/2013 | Anderson |
| 2013/0282953 A1 | 10/2013 | Orme et al. |
| 2013/0304872 A1 | 11/2013 | Flynn et al. |
| 2013/0344963 A1 | 12/2013 | Gupta et al. |
| 2014/0025990 A1 | 1/2014 | Akutsu et al. |
| 2014/0101375 A1 | 4/2014 | Thatcher et al. |
| 2014/0101376 A1 | 4/2014 | Flynn et al. |
| 2014/0189216 A1 | 7/2014 | Flynn et al. |
| 2014/0372549 A1* | 12/2014 | Li-On et al. ............ H04L 45/24 709/213 |

FOREIGN PATENT DOCUMENTS

| | | |
|---|---|---|
| JP | 2005316762 | 11/2005 |
| JP | 2011159243 | 8/2011 |
| KR | 20040056295 A | 6/2004 |
| KR | 20090102788 A | 9/2009 |
| KR | 20090106139 A | 10/2009 |
| KR | 20110104428 A | 9/2011 |

* cited by examiner

STORAGE CONTROLLER, STORAGE SYSTEM AND METHOD OF OPERATING STORAGE CONTROLLER

CROSS-REFERENCE TO RELATED APPLICATION

This application claims priority under 35 U.S.C. 119 to Korean Patent Application No. 10-2014-0047443 filed on Apr. 21, 2014, the subject matter of which is hereby incorporated by reference.

BACKGROUND

The inventive concept relates to storage controllers, storage systems and methods of operating a storage controller.

A redundant array of inexpensive or independent disks (RAID) technology is used to divide data into multiple data sections, distribute and store the divided data sections across multiple disks and may have various levels. For example, in a RAID 5 system, while striping data and storing the striped data onto a plurality of disks in a distributed manner, the data is stored with a parity bit that may be used to recover the data stored on a pertinent disk in the event of a read data failure. The parity bit may be obtained by performing an exclusive-OR (XOR) operation on the striped data. In another example, a RAID 6 system uses first and second parity bits to provide a data recovery capability.

A computational system using RAID usually includes a central RAID controller for controlling a plurality of data storage disks (hereafter, "storage disks" or "storage devices"). The central RAID controller controls the storage devices while processing RAID requests directed to data stored on the storage devices. However, as RAID requests become more frequent, the operating load (or computational overhead) placed upon central RAID controller may increase to the point where performance of the computational system is impaired.

SUMMARY

Embodiments of the inventive concept variously provides storage controllers, data storage systems and methods of operating a storage controller that provide improved performance of a distributed storage system by distributing a RAID request to one or more storage devices.

In one embodiment, the inventive concept provides a redundant array of independent disks (RAID) storage system, comprising; a RAID master controller that receives a RAID request, a first storage device including a first RAID processing unit that receives the RAID request from the RAID master controller and determines whether distribution of a RAID sub-request is necessary, wherein upon determining that the distribution of a RAID sub-request is not necessary the RAID processing unit directly processes the RAID request, and a first RAID request distributing unit that upon determining that the distribution of a RAID sub-request is necessary, communicates the RAID sub-request to a second storage device via a direct network connection between the first storage device and second storage device.

In another embodiment, the inventive concept provides a redundant array of independent disks (RAID) storage system, comprising; a host including a RAID master controller that receives a RAID request and is configured to selectively communicate the RAID request to one of a plurality of storage devices including a first storage device and a second storage, wherein the first storage device and second storage device are directly connected outside a data communication path including the host, and the first storage device is configured to determine upon receiving the RAID request from the RAID master controller whether distribution of a RAID sub-request to the second storage device is necessary, such that upon determining that the distribution of a RAID sub-request is necessary, the first RAID controller communicates the RAID sub-request to the second storage device.

In another embodiment, the inventive concept provides a method of operating a storage controller, comprising; controlling a first storage device to directly process a first RAID request assigned from a RAID master controller, and distributing a second RAID request associated with the first RAID request to one or more storage devices including a second storage device.

BRIEF DESCRIPTION OF THE DRAWINGS

The above and other features and advantages of the present inventive concept will become more apparent by describing in detail preferred embodiments thereof with reference to the attached drawings in which.

DETAILED DESCRIPTION OF EMBODIMENTS

Certain embodiments of the inventive concept will now be described in some additional detail with reference to the accompanying drawings. The inventive concept may, however, be embodied in different forms and should not be construed as being limited to only the illustrated embodiments. Rather, these embodiments are provided so that this disclosure will be thorough and complete, and will filly convey the scope of the inventive concept to those skilled in the art. Throughout the written description and drawings, like reference numbers and labels are used to denote like or similar elements.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the inventive concept (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this inventive concept belongs. It is noted that the use of any and all examples, or exemplary terms provided herein is intended merely to better illuminate the inventive concept and is not a limitation on the scope of the inventive concept unless otherwise specified. Further, unless defined otherwise, all terms defined in generally used dictionaries may not be overly interpreted.

Figure 1:
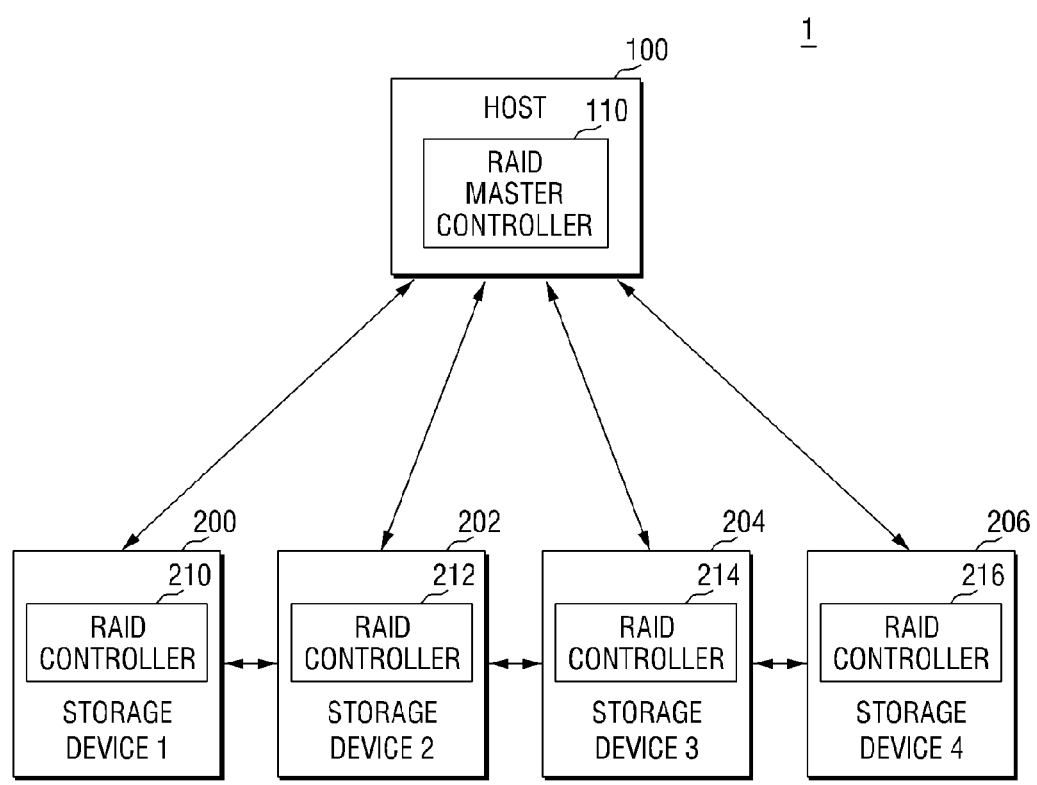
FIG. 1 is a block diagram illustrating a storage system according to an embodiment of the inventive concept.

FIG. 1 is a block diagram illustrating a storage system according to an embodiment of the inventive concept.

Referring to FIG. 1, the storage system 1 comprises a host 100 and a plurality of storage devices 200, 202, 204 and 206.

The host 100 receives data input and data output requests (hereafter, collectively or singularly, "data I/O requests" or "RAID requests") and executes corresponding data I/O operations directed to one or more of the plurality of storage devices 200, 202, 204 and 206. A data I/O request may result in the execution of one or more of a data storage operation, a data update operation, and/or a data read operation. Much of the description that follows will focus on a case assuming that the received data I/O request is a request resulting in a data storage operation (i.e., a data storage request). However, the scope of the inventive concept is not limited to only this type of request and corresponding operation.

The host 100 is assumed to receive data I/O requests arising from execution of an application on the host 100, but other request origins and types are contemplated by the inventive concept. In response to the received data I/O request, the host 100 may cause the RAID operation indicated by the data I/O request to be distributed across and processed collectively by the plurality of storage devices 200, 202, 204 and 206. For example, assuming the received data I/O request is a data storage request, the host 100 may store the corresponding "write data" across the plurality of storage devices 200, 202, 204 and 206 in a distributed manner using a RAID system.

In order to operate the RAID system, the host 100 shown in FIG. 1 includes a RAID master controller 110 that will be described in some additional detail with reference to the examples illustrated in FIGS. 2 and 3. However, in certain embodiments of the inventive concept, the host 100 may be embodied as a personal computer, such as a desk-top computer, a server computer, a portable computer, such as a notebook computer, or a portable device, such as a cellular phone, a smart phone, a tablet, MP3, a portable multimedia player (PMP), a personal digital assistant (PDA), a digital camera, a camcorder, and so on.

Each one of the plurality of storage devices 200, 202, 204 and 206 may respectively execute a data I/O operation in response to a data I/O command received from the host 100. For example, each one of the storage devices 200, 202, 204 and 206 may read data from a constituent flash memory as indicated by a data read command received from the host 100, and may then communicate the "read data" to the host 100. Alternately or additionally, each one of the storage devices 200, 202, 204 and 206 may store the write data in the constituent flash memory as indicated by a data storage command received from the host 100.

In certain embodiments of the inventive concept, the storage devices 200, 202, 204 and 206 may be respective solid state disks (SSDs) that communicate with the host 100 via a PCI express (PCIe) interface, but various interfaces may be used in embodiments of the inventive concept. As shown in FIG. 1, each one of the storage devices 200, 202, 204 and 206 may include respective RAID controllers 210, 212, 214 and 216. The RAID controllers are configured to implement the RAID system in conjunction with the RAID master controller 110 and will later be described in some additional detail with reference to the embodiments shown in FIGS. 4 and 5.

According to certain embodiments of the inventive concept, a "direct network connection" may be established between two or more of the plurality of storage devices 200, 202, 204 and 206. For example, the storage device 200 and storage device 202 may establish a direct network connection (or may be "directly connected") in a one-to-one relationship. Within this established relationship, the storage device 200 and storage device 202 may function as connected transceivers with respect to both commands and corresponding data. Here, the direct network connection may include a hard-wired connection, and/or a wireless connection, such as a local area network (LAN), a WIFI network or a cellular network. Those skilled in the art will understand that direct network connections between two or more storage devices may utilize one or more data communication protocols, such as a universal serial bus (USB), a small computer system interface (SCSI), a PCI express, ATA, parallel ATA (PATA), serial ATA (SATA), serial attached SCSI (SAS), PCI express (PCIe), etc.

Figure 2:
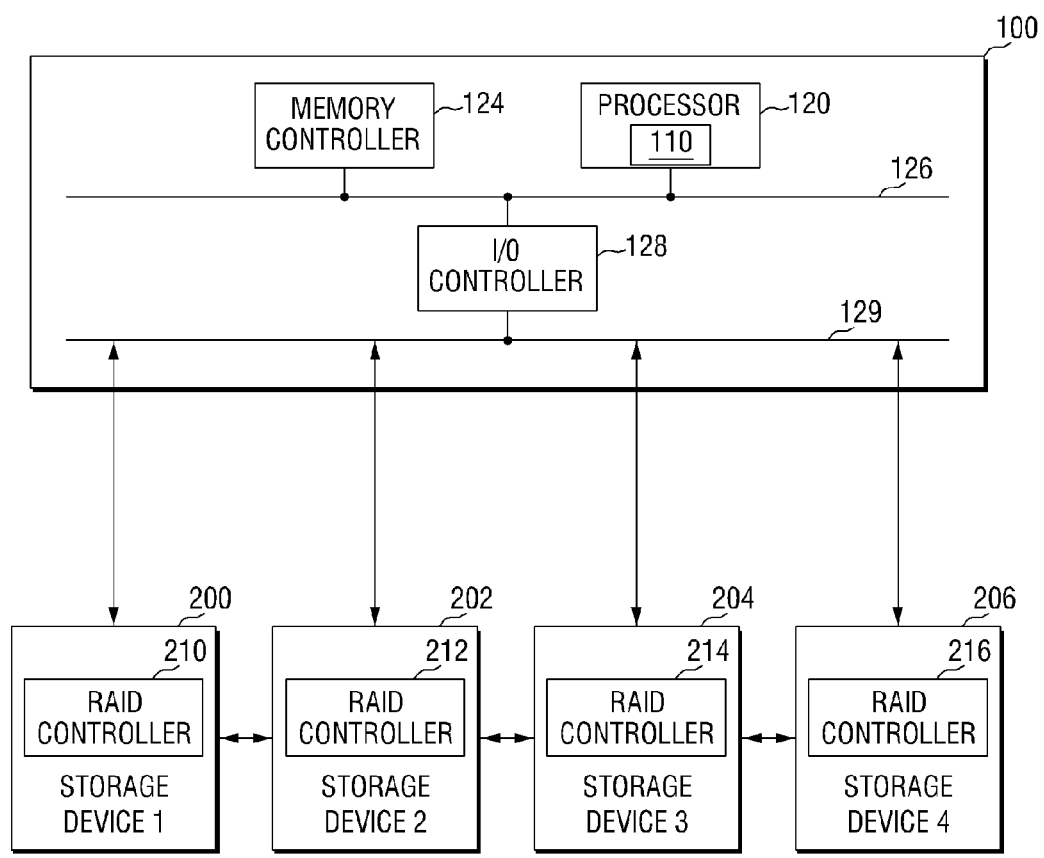
FIG. 2 is a block diagram further illustrating in one example the host 100 of the storage system of FIG. 1.

FIG. 2 is a block diagram further illustrating in one example the host 100 of FIG. 1 storage system according to an embodiment of the inventive concept.

Referring to FIG. 2, the host 100 comprises a processor 120, a memory controller 124 and an I/O controller 128.

The processor 120 may be implemented as circuitry, logic block(s), and/or software code. The processor 120 controls the overall operation of the host 100, analyzes a data I/O request received from a user, and causes various data I/O operations to be executed in relation to the plurality of storage devices 200, 202, 204 and 206 connected to the host 100.

The memory controller 124 controls a memory (not shown) provided in the host 100. The memory provided in the host 100 may be used to temporarily store read/write data associated with one or more data I/O requests directed to the plurality of storage devices 200, 202, 204 and 206. For example, the memory provided in the host 100 may include a dynamic random access memory (DRAM), a static random access memory (SRAM) or a double data rate synchronous DRAM (DDR SDRAM). For example, the memory controller 124 may transmit the data stored in the memory to the I/O controller 128 according to a command received from the processor 120.

The I/O controller 128 may be sued to control the communication of write data to be written to the plurality of storage devices 200, 202, 204 and 206, or the communication of read data retrieved from the plurality of storage devices 200, 202, 204 and 206.

The processor 120, the memory controller 124 and the I/O controller 128 may be electrically connected to one another through a system bus 126. In certain embodiments of the inventive concept, the I/O controller 128 and each of the plurality of storage devices 200, 202, 204 and 206 may be electrically connected to each other through an I/O bus 129.

The RAID master controller 110 shown in FIG. 1 controls the overall operation of the RAID system and controls the distributed writing and/or reading of data with respect to the plurality of storage devices 200, 202, 204 and 206. For example, the RAID master controller 110 may be used to "stripe" the data, and then store the resulting "striped data" across the plurality of storage devices 200, 202, 204 and 206 in a distributed manner. In addition, the RAID master controller 110 may store parity bit(s) (hereafter, individually or collectively "parity data") obtained (e.g.) by performing XOR operations on the striped data in the plurality of storage devices 200, 202, 204 and 206 in a distributed manner. Thus, in case of a data read failure arising with respect to any one of the plurality of storage devices 200, 202, 204 and 206, write data stored in the storage device suffering the failure may be recovered using the parity data. Here, the RAID master controller 110 may be implemented using software and/or hardware.

Referring again to FIG. 2, in a case where the RAID master controller 110 is implemented in software, the processor 120 may operate the RAID system by executing the software implementing the functionality of the RAID master controller 110.

Figure 3:
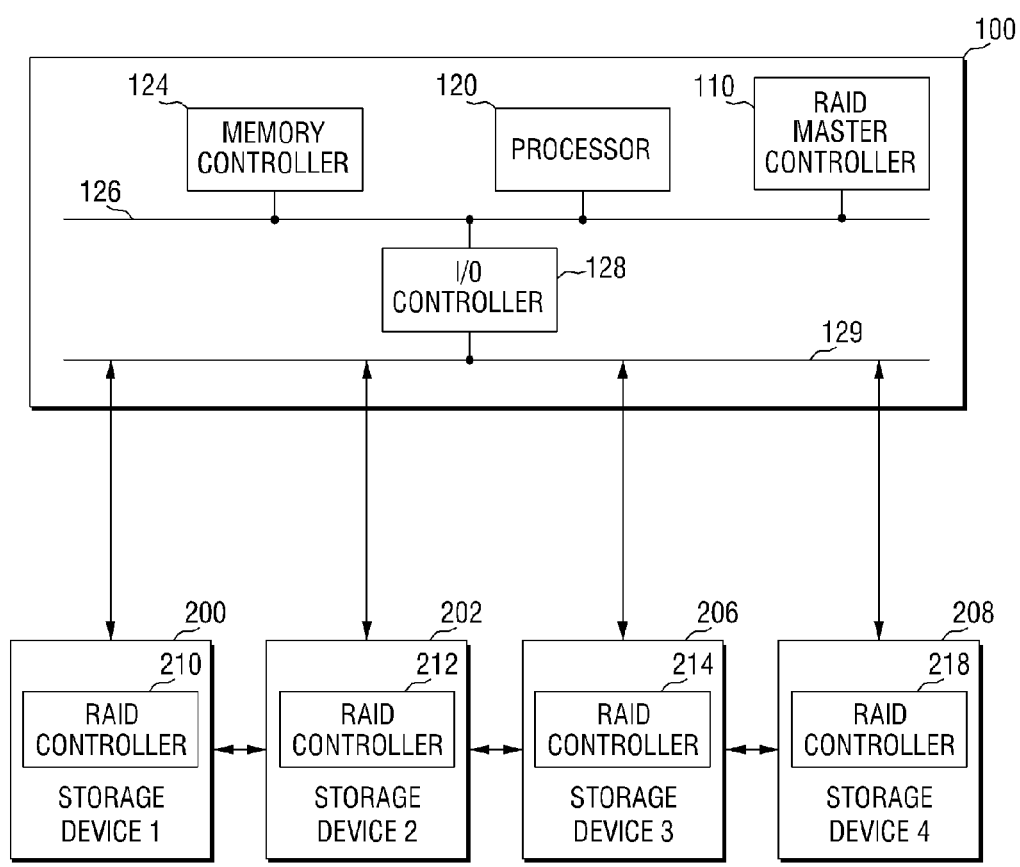
FIG. 3 is a block diagram further illustrating in another example the host 100 of the storage system of FIG. 1.

FIG. 3 is a block diagram further illustrating in another example the host 110 of FIG. 1 according to another embodiment of the inventive concept.

Referring to FIG. 3, the host 100 comprises a RAID master controller 110, a processor 120, a memory controller 124 and an I/O controller 128. The host 100 is different from that shown in FIG. 2 in that the RAID master controller 110 is implemented in hardware, rather than software, and as such is electrically connected to the processor 120, the memory controller 124 and the I/O controller 128 through a system bus 126.

Figure 4:
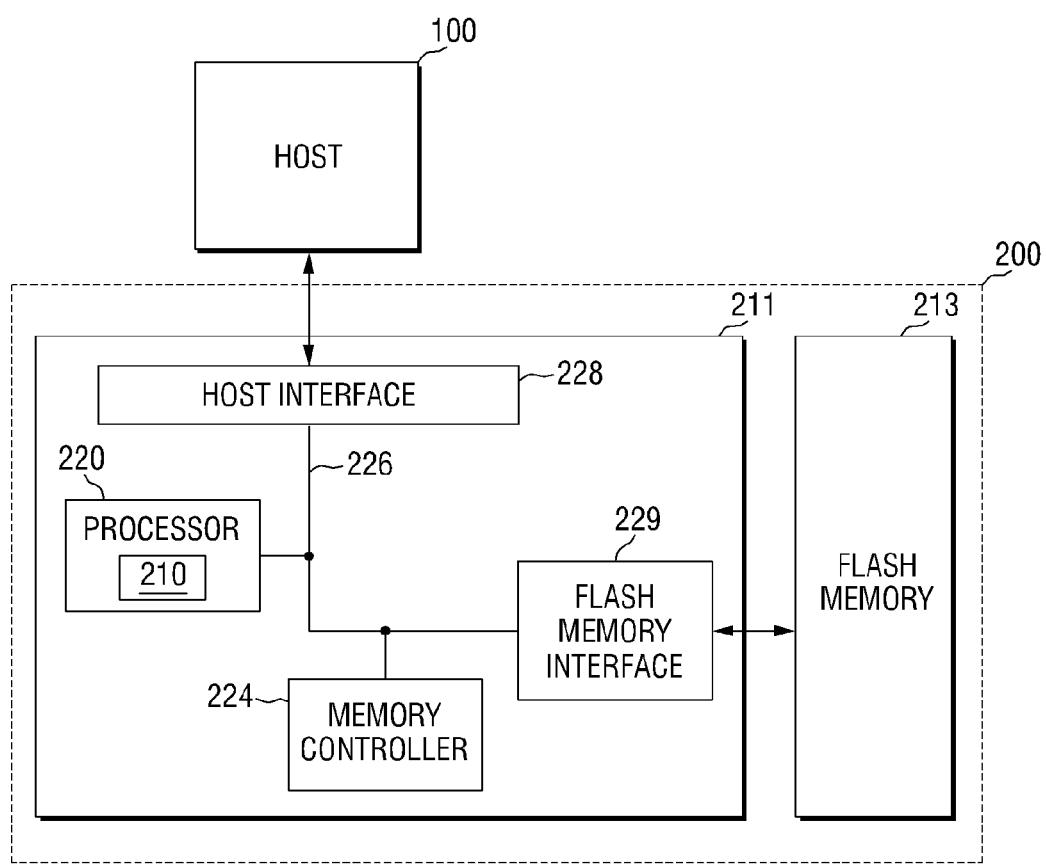
FIG. 4 is a block diagram further illustrating in one example a storage device used in the storage system of FIG. 1.

FIG. 4 is a block diagram further illustrating in one example the storage device 200 of FIG. 1 according to an embodiment of the inventive concept.

Referring to FIG. 4, the storage device 200 comprises a flash memory controller 211 and a flash memory 213, where the flash memory controller 211 includes a processor 220, a memory controller 224, a host interface 228 and a flash memory interface 229.

The processor 220 may be implemented by circuitry, logic blocks, and/or software code, and may be used to control the overall operation of the storage device 200. If power is applied to the storage device 200, the processor 220 may being the control of the storage device 200 by driving firmware for operating the storage device 200 stored in a read only memory (ROM) (not shown). In addition, the processor 220 may be used to analyze command(s) received from the host interface 228 and control the overall operation of the flash memory 213 according to the analysis result. In addition, the processor 220 may map logic address(es) supplied from the host 100 onto corresponding physical address(es) in the flash memory 213 using one or more address mapping table(s).

The memory controller 224 may be used to control a local memory provided in the storage device 200. The local memory (not shown) be a read only memory (ROM) or a random access memory (RAM). In certain embodiments of the inventive concept, the ROM may store firmware codes for driving the storage device 200, and the RAM may serve as a data buffer storing various commands and/or parameters received from the host interface 228. In addition, the RAM may also store write data to be stored in the flash memory 213 or read data retrieved from the flash memory 213.

The host interface 226 may be used to perform various interfacing functions between the storage device 200 and host 100, and the flash memory interface 229 may be used to perform interfacing between the flash memory controller 211 and flash memory 213.

The flash memory 213 may be used to store write data supplied from the flash memory controller 211. That is, the flash memory 213 may include a plurality of cell arrays storing data. The cell arrays may include a plurality of planes, which include a plurality of blocks, which include a plurality of pages. In some embodiments of the inventive concept, the flash memory 213 may be a nonvolatile memory, including an electrically erasable programmable read-only memory (EEPROM) a ferroelectric random access memory (FRAM), a phase-change random access memory (PRAM), and a magnetic random access memory (MRAM).

The RAID controller 210 shown in FIG. 1 implements the RAID system in cooperation with the RAID master controller 110. In particular, the RAID controller 210 may directly process data I/O requests that can be executed by the RAID master controller 110. For example, the RAID controller 210 may be used to stripe data, store the resulting striped data in the storage device 200, and may also be used to generate parity data derived from the striped data and store the parity data in (e.g.) the storage device 206. As a result, when a failure occurs to the storage device 200, the data stored in the storage device 200 may be recovered using the parity data stored in the storage device 206. Thus, the RAID controller 210 may distribute the aforementioned operations across a number of different regions. That is, the RAID controller 210 controlling the storage device 200 may issue a request for processing some of the RAID requests to the storage devices 202, 204 and 206.

Referring again to FIG. 4, in a case where the RAID controller 210 is implemented using software, the processor 220 may execute the RAID requests on the storage device 200 by executing the software implementing the RAID controller 210.

Figure 5:
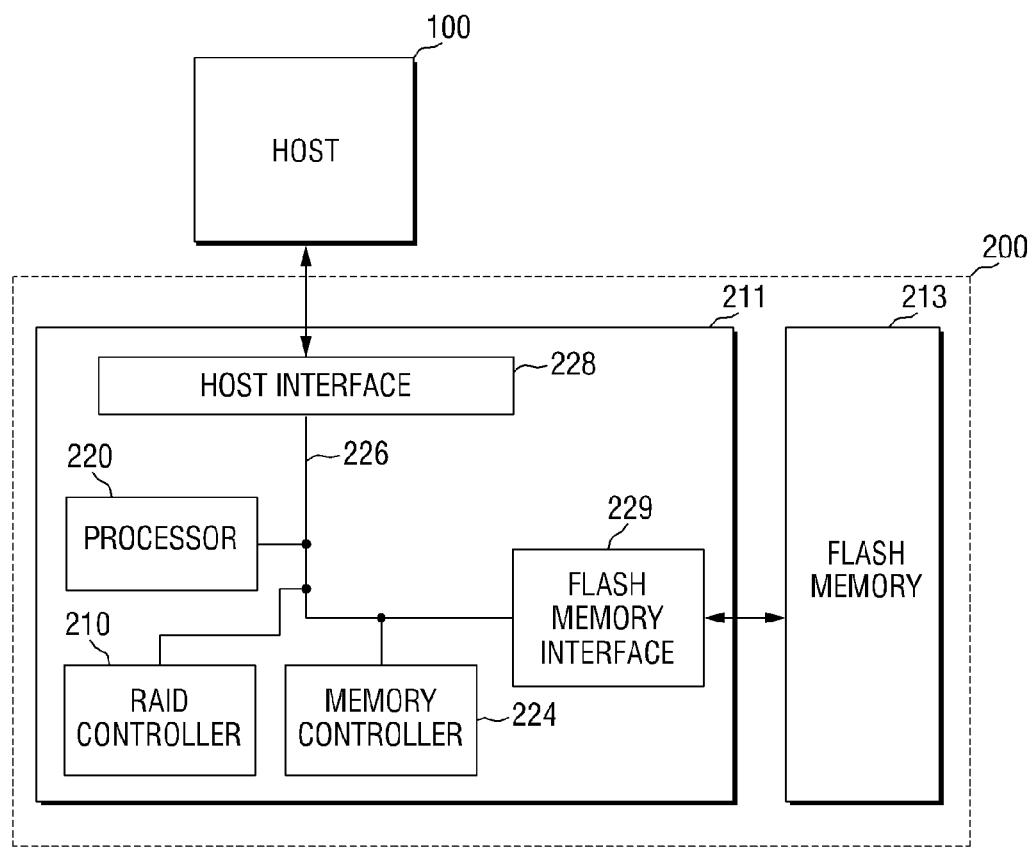
FIG. 5 is a block diagram further illustrating in another example a storage device used in the storage system of FIG. 1.

FIG. 5 is a block diagram further illustrating the storage device 200 of FIG. 1 according to an embodiment of the inventive concept.

Referring to FIG. 5, the storage device 200 again comprises a flash memory controller 211 and a flash memory 213, however the flash memory controller 211 further includes the RAID controller 210 along with the processor 220, memory controller 224, host interface 226 and flash memory interface 229. Here, the storage device 200 is different from that shown in FIG. 4 in that the RAID controller 210 is assumed to be implemented in hardware. The RAID controller 210 implemented in hardware may be electrically connected to the processor 220, the memory controller 224, the host interface 226 and the flash memory interface 229 through an internal bus 226.

Figure 6:
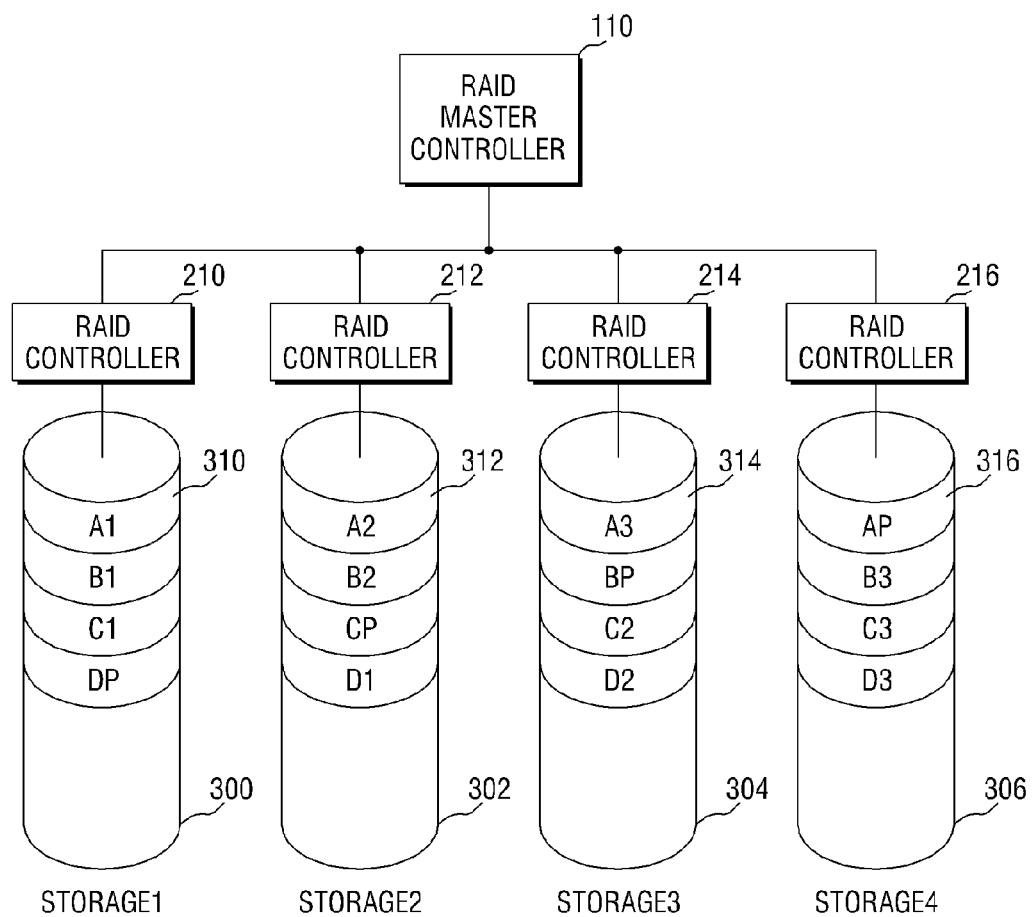
FIG. 6 is a block diagram illustrating a RAID management method used in a storage system according to the inventive concept.

FIG. 6 is a block diagram illustrating a RAID management method that may be used in conjunction with a storage system according to an embodiment of the inventive concept.

Referring to FIG. 6, write data associated with a write data request may be striped to then be stored across a plurality of data storage regions 300, 302, 304 and 306 in a distributed manner. Here, the plurality of data storage regions 300, 302, 304 and 306 may be flash memories provided in a plurality of storage devices 200, 202, 204 and 206. For example, the write data may be striped into data A1 310, data A2 312 and data A3 314. The data A1 310 may be stored in the data storage region 300, the data A2 312 may be stored in the data storage region 302, and the data A3 314 may be stored in the data storage region 304. In addition, parity data AP 316 derived from the data A1 310, the data A2 312 and the data A3 314 may be stored in the data storage region 306. The parity data AP 316 may then be used, as necessary, in recovering the data A1 310, the data A2 312 and the data A3 314 should a failure occurs to a related storage device.

Thus, the RAID master controller 110 may assign the aforementioned data I/O requests to the RAID controllers 210, 212, 214 and 216. That is to say, the RAID master controller 110 may assign any data I/O request requiring data storage, data update or data reading to one or more of the RAID controllers 210, 212, 214 and 216 which will then directly process the assigned data I/O request. Each one of the RAID controllers 210, 212, 214 and 216 may directly process a data I/O request assigned by the RAID master controller 110, or it may distribute the data I/O request assigned by the RAID master controller 110 to another one of the RAID controllers using a direct network connection.

For example, in a case where the RAID master controller 110 assigns the RAID request for updating the data A1 310 to the RAID controller 210, and the RAID controller 210 may directly process the request for updating the data A1 310. If the data A1 310 is updated, the parity data AP 316 should also be updated to properly operate the RAID system. In this case, the RAID controller 210 may distribute a request for updating the parity data AP 316 to the RAID controller 216. The RAID controller 216 may then process the data I/O request assigned from the RAID controller 210, that is, the request for updating the parity data AP 316, and may transmit the execution result to the RAID controller 210.

Figure 7:
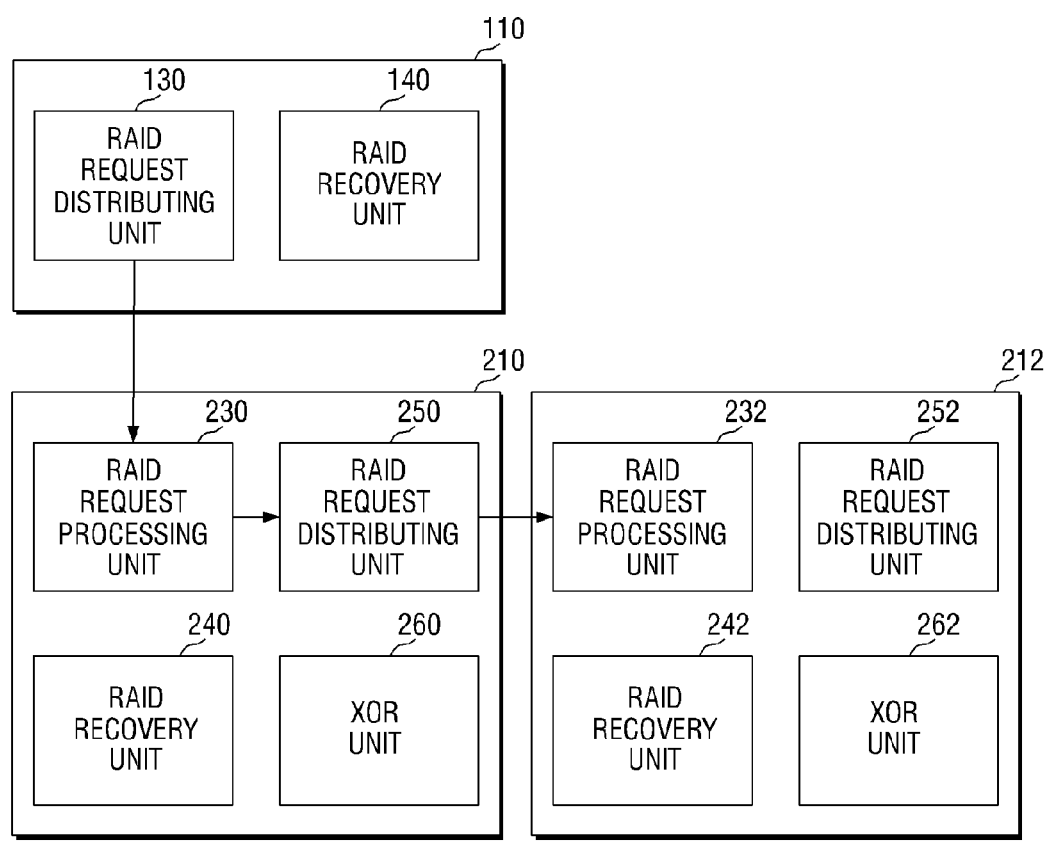
FIG. 7 is a block diagram further illustrating in one example the RAID management method of FIG. 6.

FIG. 7 is a block diagram illustrating a storage controller according to an embodiment of the inventive concept.

Referring to FIG. 7, the RAID master controller 110 comprises a RAID request distributing unit 130 and a RAID recovery unit 140. The RAID request distributing unit 130 assigns RAID requests for operating a RAID system to RAID controllers 210 and 212. The RAID recovery unit 140 recovers data stored in a storage device having a failure among the storage devices controlled by the RAID controllers 210 and 212.

The RAID controller 210 includes a RAID request processing unit 230, a RAID recovery unit 240, and a RAID request distributing unit 250. The RAID request processing unit 230 controls a storage device including the RAID controller 210 by directly processing first RAID request assigned by the RAID master controller 110. When a failure occurs to the storage device including the RAID controller 210, the RAID recovery unit 240 recovers data using the parity data stored in another storage device.

The RAID request distributing unit 250 distributes a second RAID request associated with the first RAID request to one or more other storage devices. For example, the RAID request distributing unit 250 of the RAID controller 210 may distribute the second RAID request to another storage device controlled by the RAID controller 210, and the RAID request processing unit 230 included in the RAID controller 210 may process the distributed second RAID request. In certain embodiments of the inventive concept, the second RAID request may include some requests of the first RAID request. For example, when the first RAID request is a read data request directed to data stored in the storage devices 200, 202 and 204, the second RAID request may be a request for reading the data stored in the storage device 204. Here, the second RAID request may include a new request generated based on the first RAID request. For example, when the first RAID request is a request for updating the data stored in the storage device 200, the second RAID request may be a request for updating corresponding parity data stored in the storage device 208.

The RAID controller 210 may also include an XOR unit 260 performing an XOR operation on data.

Figure 8:
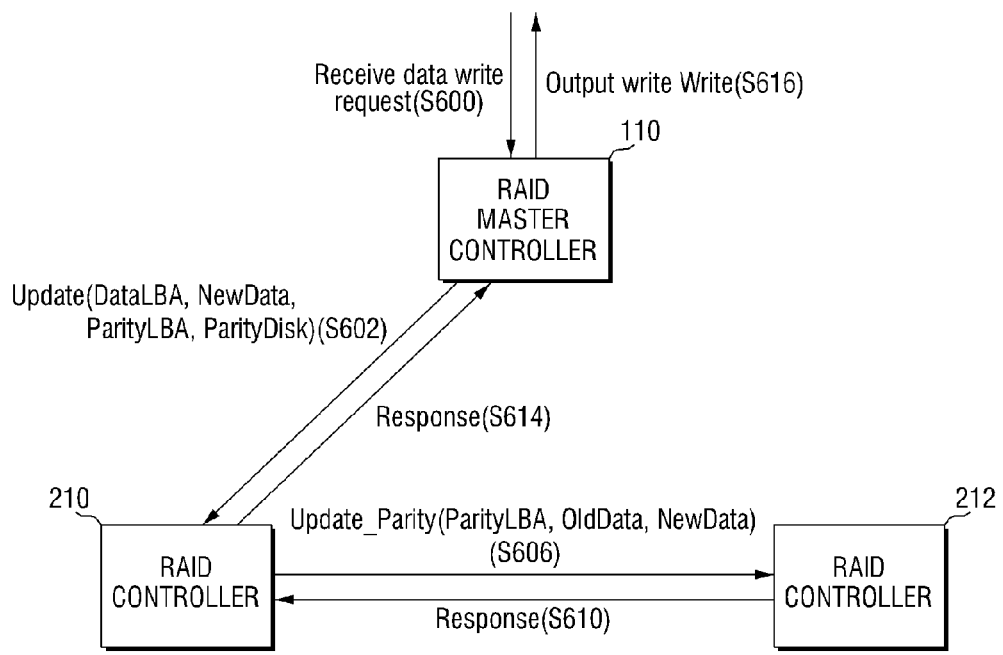
FIG. 8 is an operational diagram illustrating a method of operating a storage controller for processing RAID requests according to an embodiment of the inventive concept.

FIG. 8 is an operational diagram illustrating a method of operating a storage controller for processing RAID requests according to an embodiment of the inventive concept.

Referring to FIG. 8, the RAID master controller 110 receives a data write request from a user (S600). Here, it is assumed that the RAID controller 210 controls the storage device 200 and the RAID controller 212 controls the storage device 202. The RAID master controller 110 assigns a first RAID request to the RAID controller 210 using the RAID request distributing unit 130. The first RAID request is a request for updating old data stored in the storage device 202 with new data. To this end, the RAID master controller 110 supplies a data logic block address ("DataLBA"), new data ("NewData"), a parity logic block address ("ParityLBA") and information for identifying a parity storage ("ParityDisk") to the RAID controller 210 (S602).

The RAID request processing unit 230 of the RAID controller 210 updates old data to new data according to the first RAID request (S604). That is, the RAID request processing unit 230 stores the new data ("NewData") in the new data physical block address ("NewPBA"), maps the data logic block address ("DataLBA") to the new data physical block address ("NewPBA") and stores mapping data (S612). The RAID request distributing unit 250 of the RAID controller 210 communicates the second RAID request for updating the corresponding parity data of the storage device 202 to the storage device 202 with the old data ("OldData") and the new data ("NewData") (S606). Assuming that the storage device 200 and the storage device 202 have established a direct network connection, the RAID controller 230 may directly communicate the second RAID request to the storage device 202. That is to say, the RAID controller 210 may communicate the second RAID request directly to the storage device 202 without requiring the intervention of (and further loading) the RAID master controller 110.

The RAID controller 212 may update the parity data using the old data ("OldData") and the new data ("NewData") according to the second RAID request. That is, an XOR unit 262 of the RAID controller 212 may be used to generate new parity data ("NewParity") by performing XOR operations on the old data ("OldData"). Then, the new data ("NewData") and the old parity data ("OldParity") may be stored in the storage device 202 (S608). If a failure occurs to the storage device 200, the RAID recovery unit 240 of the RAID controller 210 may recover the data of the storage device 200 using the updated new parity data ("NewParity") from the storage device 202. In certain embodiments of the inventive concept, the RAID recovery unit 240 may use an error correction code (ECC) algorithm for recovering the data of the storage device 200.

The RAID controller 210 may receive a response as an execution result of the second RAID request transmitted from the RAID controller 212 (S610). In some embodiments of the inventive concept, the RAID request processing unit 230 of the RAID controller 210 may control the storage device 200 using the execution result of the second RAID request from the RAID controller 212. After receiving the execution result of the second RAID request transmitted from the RAID controller 212, the RAID controller 210 collects execution results of RAID requests and communicates a response as a final execution result to the RAID master controller 110 (S614). Then, the RAID master controller 110 outputs the response to the user to indicate that the data write request has been completed (S616).

Figure 9:
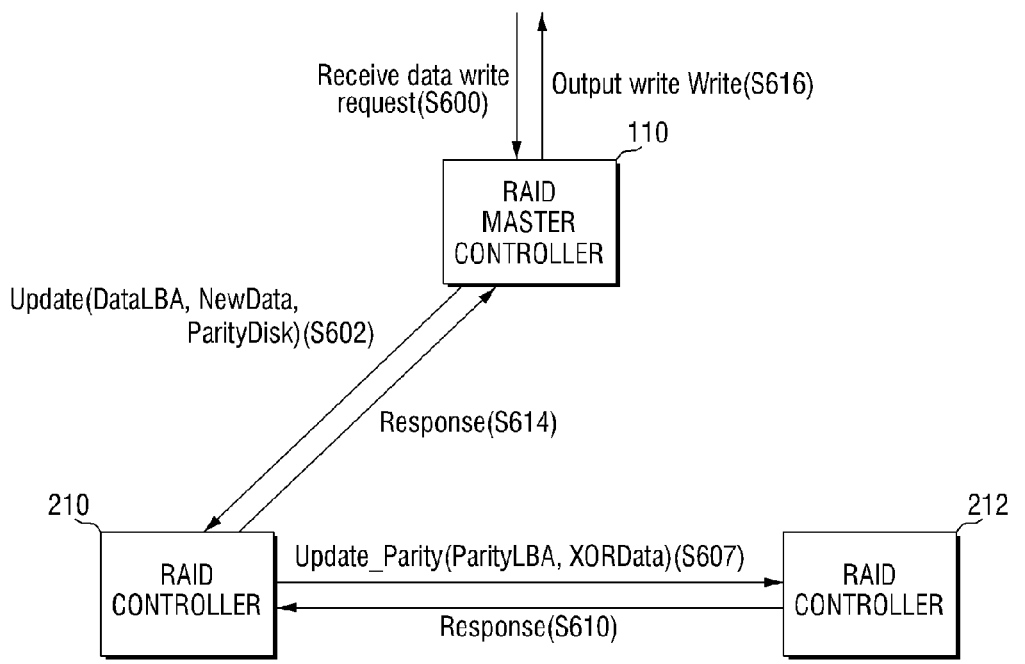
FIG. 9 is an operational diagram illustrating a method of operating a storage controller for processing RAID requests according to another embodiment of the inventive concept.

FIG. 9 is an operational diagram illustrating a method of operating a storage controller for processing RAID requests according to another embodiment of the inventive concept.

Referring to FIG. 9, the method of operating a storage controller for processing RAID requests is different from that shown in FIG. 8 in that the RAID controller 210 generates XOR data ("XORData") by performing an XOR operation on old data ("OldData") and new data ("NewData"). That is to say, the XOR unit 260 of the RAID controller 210 obtains the XOR data ("XORData") by performing an XOR operation on old data ("OldData") and new data ("NewData") (S605). The RAID request distributing unit 250 of the RAID controller 210 communicates the second RAID request for updating the parity of the storage device 202 and the XOR data ("XORData") to the RAID controller 212 of the storage device 202 (S607). In this case, the RAID controller 210 may communicate the second RAID request to the storage device 202 without requiring the intervention of the RAID master controller 110.

The RAID controller 212 updates the parity data using the XOR data ("XORData") obtained based on the old data ("OldData") and the new data ("NewData") according to the second RAID request. That is, the XOR unit 262 of the RAID controller 212 may be used to generate a new parity data ("NewParity") by performing an XOR operation on the XOR data ("XORData") and the old parity data ("OldParity") stored in the storage device 202 (S609). Then, if a failure occurs to the storage device 200, the RAID recovery unit 240 of the RAID controller 210 may recover data of the storage device 200 using the updated new parity data ("NewParity") from the storage device 202.

Figure 10:
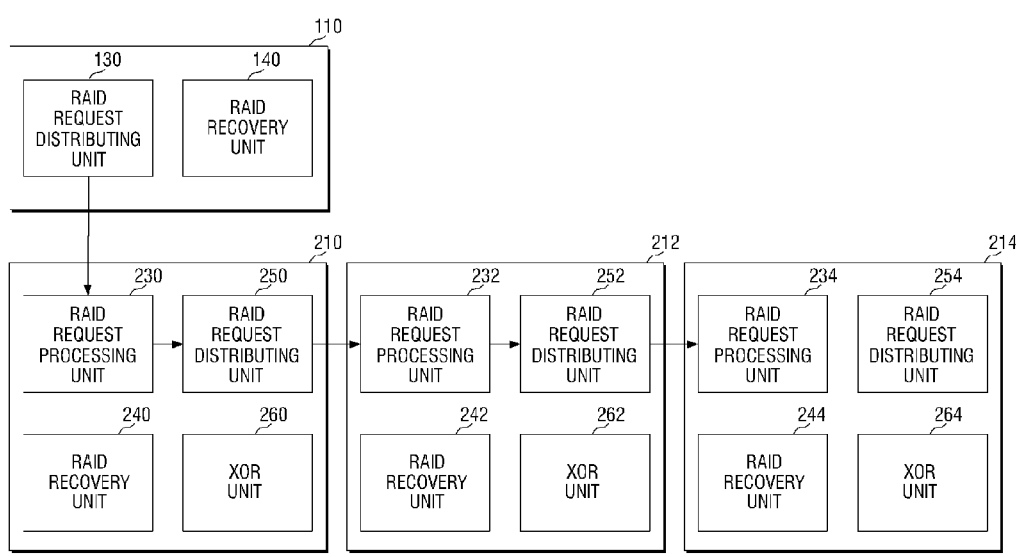
FIG. 10 is a block diagram illustrating a storage controller according to another embodiment of the inventive concept.

FIG. 10 is a block diagram illustrating a storage controller according to another embodiment of the inventive concept.

Referring to FIG. 10, the storage controller is different from that shown in FIG. 7 in that a RAID request distributing unit 252 of a RAID controller 212 distributes a third RAID request associated with a second RAID request distributed by a RAID request distributing unit 250 of a RAID controller 210 to another storage device controlled by a RAID controller 234. A RAID request processing unit 234 included in a RAID controller 214 may process the distributed third RAID request. In some embodiments of the present inventive concept, the third RAID request may include some requests of the second RAID request or may include a new request generated based on the second RAID request.

Figure 11:
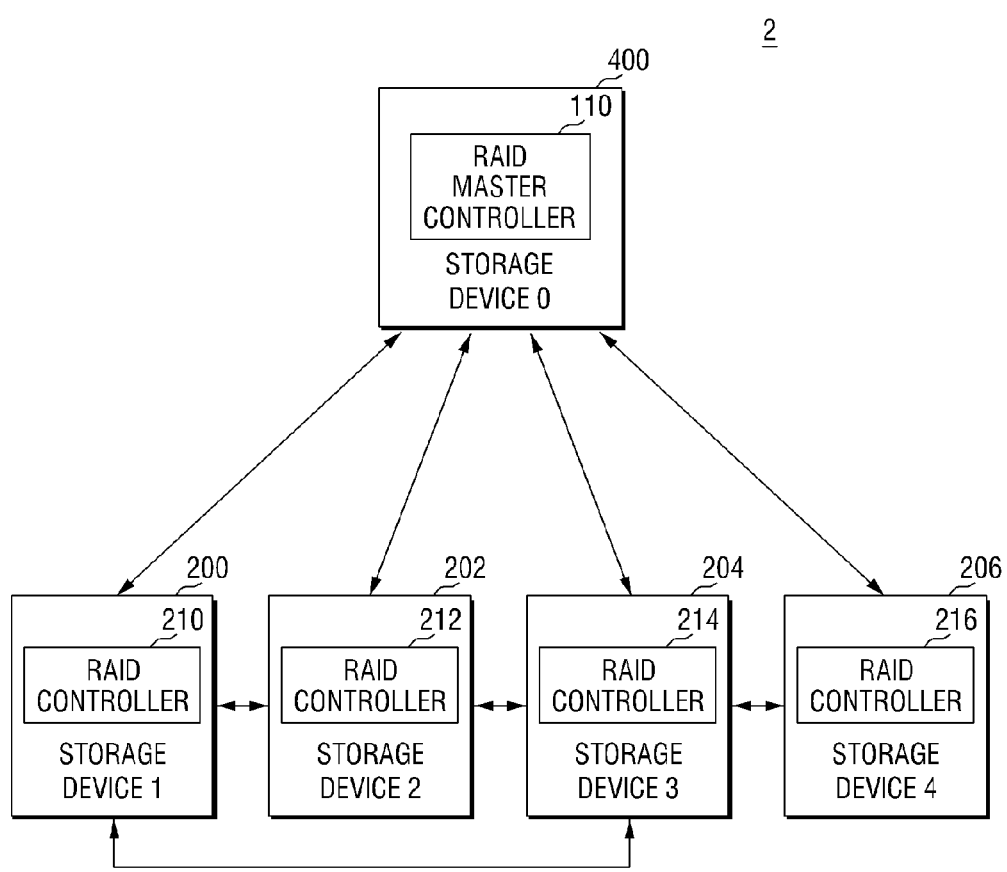
FIGS. 11 and 12 are respective block diagrams illustrating storage systems according to various embodiments of the inventive concept.

FIG. 11 is a block diagram illustrating a storage system according to another embodiment of the inventive concept.

Referring to FIG. 11, in the storage system 2, a RAID master controller 110 may be incorporated in a storage device 400, possibly including a constituent flash memory controller and a flash memory of the sort described above. That is, in certain embodiments of the inventive concept, a flash memory controller may provide the functionality previously ascribed to a processor capable of executing software implementing the RAID master controller 110, and/or comparable hardware.

As illustrated in FIG. 11, a RAID controller 210 may be used to control (e.g.) the storage device 200 by receiving and processing RAID request(s), and by distributing RAID sub-requests derived from one or more RAID requests, wherein the RAID sub-requests may be directed to different storage devices (e.g., 202 and 204). Here, for example, the storage device 200 is shown as having established separate direct network connections with storage device 202 and storage device 204.

Figure 12:
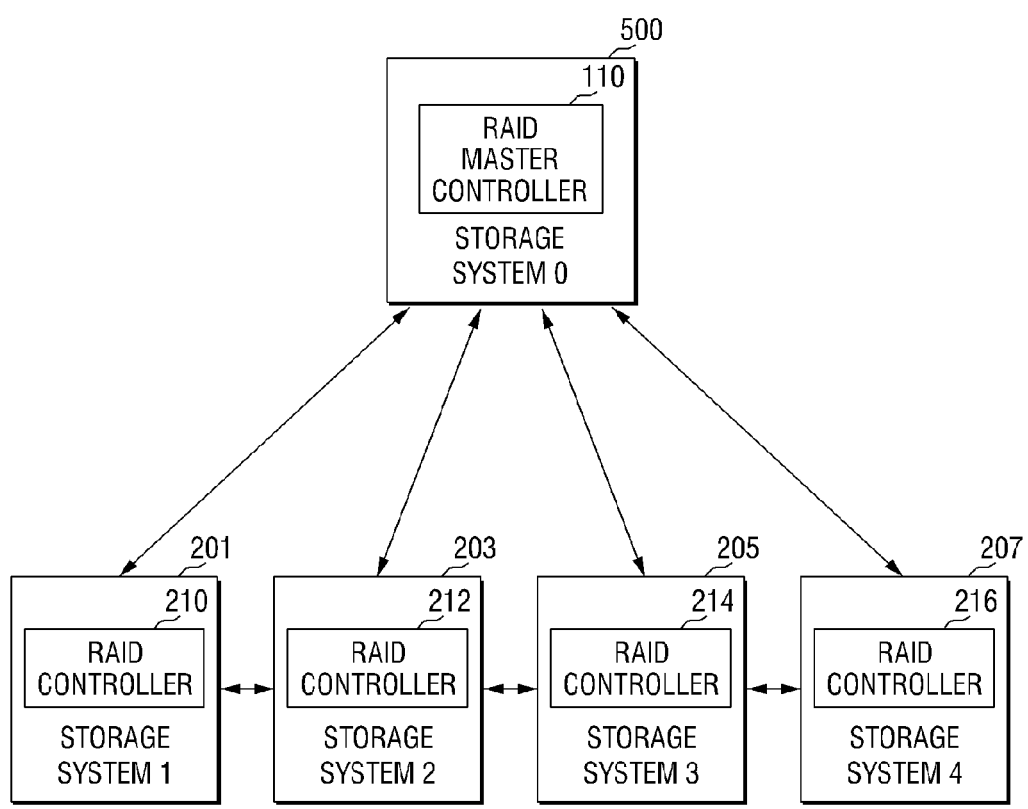

FIG. 12 is a block diagram illustrating a storage system according to still another embodiment of the inventive concept.

Referring to FIG. 12, in the storage system 3, a RAID master controller 110 is included in a storage system 500 also including a plurality of storage devices. Likewise, the RAID controllers 210, 212, 214 and 216 may be implemented in storage systems 201, 203, 205 and 207 500 each including a plurality of storage devices, respectively.

Figure 13:
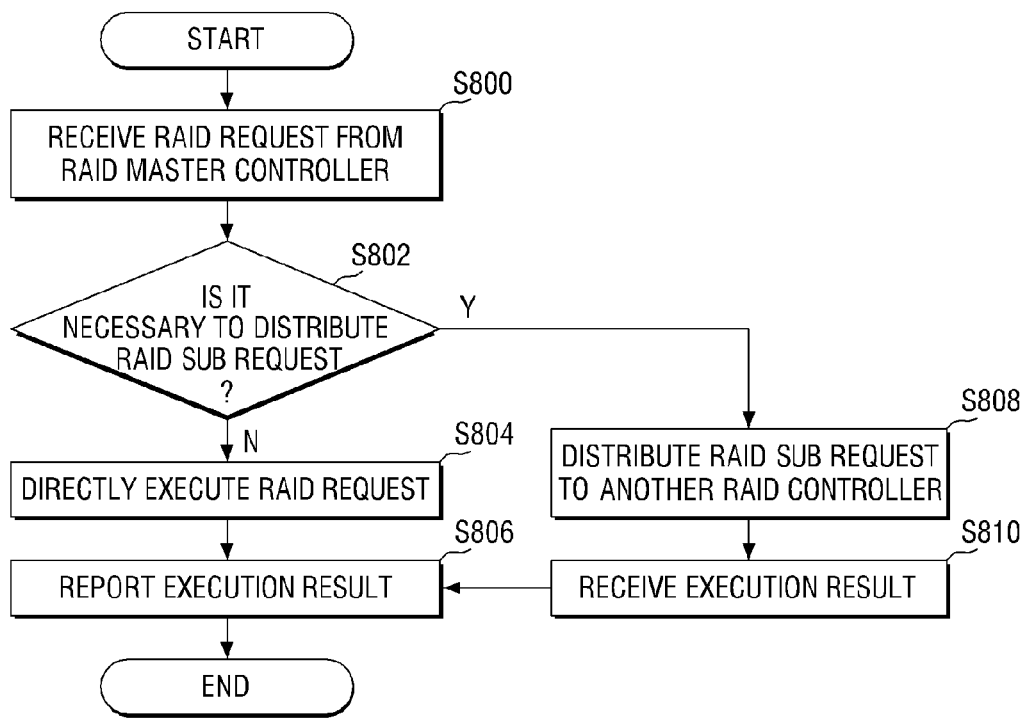
FIGS. 13, 14 and 15 are respective flowcharts summarizing examples of various methods of operating a storage controller for processing RAID requests according to embodiments of the inventive concept.

FIG. 13 is a flowchart summarizing in one example a method of operating a storage controller for processing RAID requests according to an embodiment of the inventive concept.

Referring to FIG. 13, a first RAID controller 210 is assumed to receive a RAID request from the RAID master controller 110 (S800). The first RAID controller 210 then determines whether it is necessary to distribute a related RAID request (or rather, whether it is necessary to distribute any RAID sub-requests related to the received RAID request) (S802). If not (S802=No), the first RAID controller 210 directly (i.e., without recourse to any other controller) executes the received RAID request (S804) and then reports completion of same (S806).

However, if it is deemed necessary to distribute one or more RAID sub-requests related to the received RAID request (S802=Yes), the one or more RAID sub-requests are distributed accordingly (S808). For example, the first RAID controller 212 may determine that it is necessary to issue a related RAID sub-request to a second RAID controller 212. Thereafter, the first RAID controller 210 will receive (or collect) the execution results associated with the RAID sub-request (S810) before returning a final execution result to the RAID master controller 110.

Figure 14:
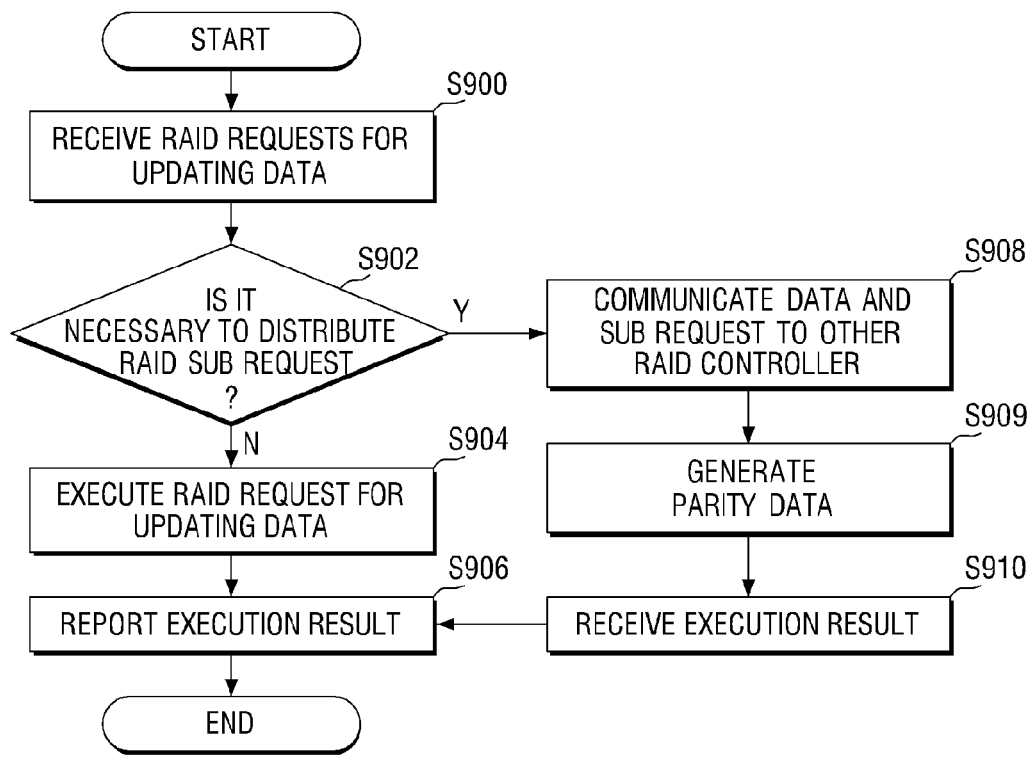

FIG. 14 is a flowchart summarizing in another example a method of operating a storage controller for processing RAID requests according to an embodiment of the inventive concept.

The method illustrated in FIG. 14 is a more specific application of the method described in relation to FIG. 13. Analogous steps are similarly numbered, albeit beginning with a "9" in FIG. 14 instead of an "8" in FIG. 13. Here, the RAID request is more specifically a RAID request requiring update of stored data, along with update of corresponding parity data (S900). As before in response to this RAID request, a RAID controller receives determines whether it is necessary to distribute one or more RAID sub-requests (S902). In the illustrated example shown in FIG. 14, it is assumed that a first RAID controller 210 directly executes the data update portion of the RAID request, but also determines to issue a RAID sub-request to a second RAID controller (e.g., 212) related to the update of the parity data. Hence, while the first RAID controller 210 is updating the data (S904), it may issue to the second RAID the necessary RAID sub-request (S908) required to update the corresponding parity data. In response, to the raid sub-request the second RAID controller 212 may generate the parity data (S909), and communicate the parity data to the first RAID controller 210 (S910).

Figure 15:
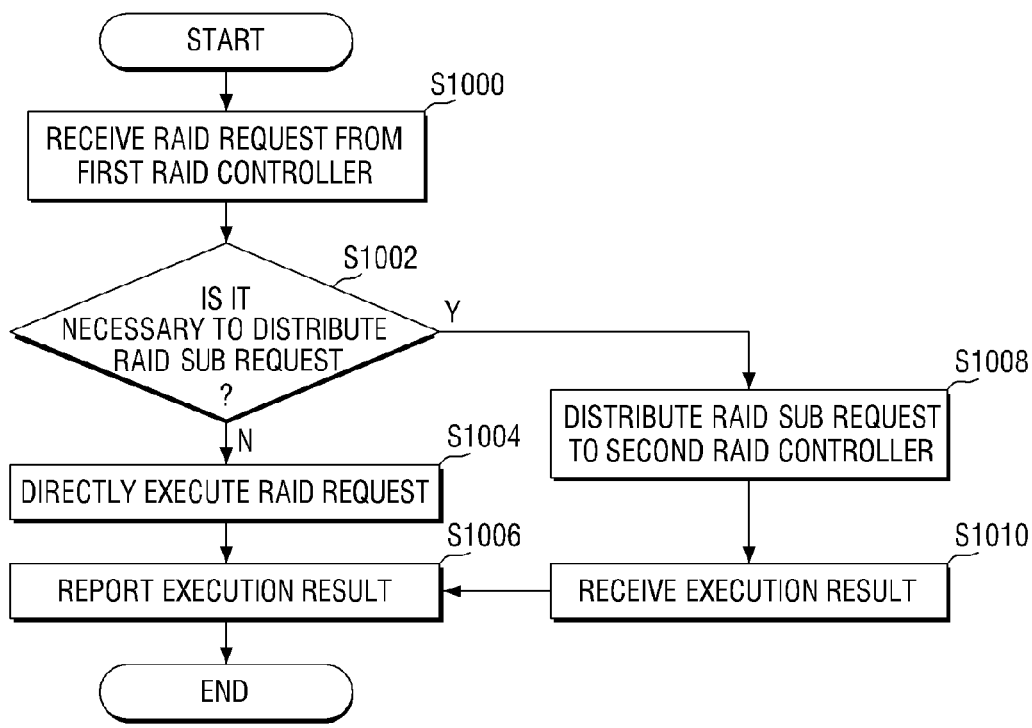

FIG. 15 is a flowchart summarizing in still another example a method of operating a storage controller for processing RAID requests according to an embodiment of the inventive concept. Analogous steps are similarly numbered, albeit beginning with a "10" in FIG. 15 instead of an "8" in FIG. 13.

Unlike the example of FIG. 13, the first RAID controller 210 rather than the master controller 110 is assumed to receive the RAID request (S1000). But as before, upon determining that a RAID sub-request is necessary (S1002), the sub-request is communicated to a second RAID controller 212 (S1008).

In the foregoing embodiments, the term "sub-request" is used to differentiate between a RAID request initially received and all related RAID request(s) stemming there form. No difference in form, communication or execution is necessary between a request and one or more sub-requests. One (i.e., the initial received request) precedes the other (i.e., the related sub-request(s)).

According to various embodiments of the inventive concept, in a case where data is updated in a RAID 5 system, performance of a distributed storage system can be improved by reducing the number of I/O operations. That is, instead of separately performing read/write operations on two storage devices, a master controller (or first controller) may distribute one of more related RAID sub-requests enabling at least some parallel processing of (e.g.,) updating of data by one RAID controller and updating of corresponding parity data by another RAID controller. As a result, the conventionally required 2 read operations and 2 write operations are replaced by only 2 write operations. Accordingly, embodiments of the inventive concept allow a reduced number of I/O operations.

In addition, storage devices constituting each of storage systems according to various embodiments of the inventive concept are not conventional passive devices but are active devices, thereby actively distributing and assigning RAID requests in other storage devices, rather than passively executing commands of the conventional central RAID controller. Therefore, according to the inventive concept, since effects of data distribution and data I/O operations including RAID requests are facilitated, an operating load of a host can be reduced.

While the present inventive concept has been particularly shown and described with reference to exemplary embodiments thereof, it will be understood by those of ordinary skill in the art that various changes in form and details may be made therein without departing from the scope of the following claims.

What is claimed is:

1. A redundant array of independent disks (RAID) storage system, comprising:
a RAID master controller that receives a RAID request and that assigns the RAID request to a first RAID controller in a first storage device that also includes a flash memory configured to store data to a plurality of cell arrays, wherein the first RAID controller processes the RAID request and includes:
a first RAID processing unit that receives the RAID request from the RAID master controller and determines whether distribution of a RAID sub-request, based on but different from the RAID request, is necessary, and that directly processes the RAID request based on determining that the distribution of a RAID sub-request is not necessary; and
a first RAID request distributing unit that upon determining that the distribution of a RAID sub-request is necessary, communicates the RAID sub-request to a second storage device via a direct network connection between the first storage device and second storage device, based on a determination from the determining that information in the second storage device corresponding to the first RAID request is to be updated.

2. The RAID storage system of claim 1,
wherein the RAID sub-request includes a new request generated based on the determining by the first RAID processing unit.

3. The RAID storage system of claim 1,
wherein the RAID request is a request to update old data stored in the first storage device with new data, and the RAID sub-request is a request to update parity data derived from the old data and stored in the second storage device.

4. The RAID storage system of claim 3,
wherein the first RAID processing unit updates the old data using the new data in response to the RAID request, and the first RAID request distributing unit communicates the RAID sub-request to the second storage device with the old data and the new data.

5. The RAID storage system of claim 4, wherein the second storage device comprises:
an exclusive-OR (XOR) unit that performs an XOR operation on the old data and the new data to generate the updated parity data; and
a second RAID request distributing unit that communicates the updated parity data from the second storage device to the first storage device.

6. The RAID storage system of claim 4,
wherein the first storage device further comprises a RAID recovery unit that recovers the new data using the updated parity data stored in the second storage device.

7. The RAID storage system of claim 6,
wherein the RAID recovery unit uses an error correction code (ECC) algorithm to recover the new data stored in the first storage device using the updated parity data stored in the second storage device.

8. The RAID storage system of claim 1,
wherein the first RAID processing unit receives an execution result from the second storage device upon completion of the RAID sub-request by the second storage device.

9. The RAID storage system of claim 8,
wherein the first RAID processing unit controls the first storage device using the execution result of the RAID sub-request received from the second storage device.

10. A redundant array of independent disks (RAID) storage system, comprising:
a host including a RAID master controller that receives a RAID request and is configured to selectively communicate the RAID request to one of a plurality of storage devices each under control of the RAID master controller, each configured to store data, and including a first storage device and a second storage device,
wherein the first storage device and second storage device are directly connected outside a data communication path that includes the host, and
the first storage device is configured to determine upon receiving the RAID request from the RAID master controller whether distribution of a RAID sub-request, based on but different from the RAID request, to the second storage device is necessary, such that upon determining that the distribution of a RAID sub-request is necessary, the first storage device communicates the RAID sub-request to the second storage device via a direct network connection between the first storage device and second storage device, based on a determination from the determining that information in the second storage device corresponding to the first RAID request is to be updated.

11. The RAID storage system of claim 10,
wherein the RAID sub-request includes a new request generated based on the determining by the first storage device.

12. The RAID storage system of claim 10, wherein the RAID request is a request to update old data stored in the first storage device with new data, and the RAID sub-request is a request to update parity data derived from the old data and stored in the second storage device.

13. The RAID storage system of claim 12,
wherein a first RAID controller of the first storage device updates the old data using the new data in response to the RAID request, and a first RAID request distributing unit of the first storage device communicates the RAID sub-request to the second storage device with the old data and the new data.

14. The RAID storage system of claim 13, wherein the second storage device comprises:
an exclusive-OR (XOR) unit that performs an XOR operation on the old data and the new data to generate the updated parity data; and a second RAID request distributing unit that communicates the updated parity data from the second storage device to the first storage device.

15. The RAID storage system of claim 13,
wherein the first storage device further comprises a RAID recovery unit configured to recover the new data using the updated parity data stored in the second storage device.

16. The RAID storage system of claim 10,
wherein a first RAID controller of the first storage device receives an execution result from the second storage device upon completion of the RAID sub-request by the second storage device.

17. A method of operating a storage controller, comprising:
controlling a first storage device, configured to store data, to directly process a first RAID request assigned from a RAID master controller that controls the first storage device; and
distributing a second RAID request associated with, and based on but different from, the first RAID request from the first storage device to one or more storage devices, each configured to store data, each under control of the RAID master controller, and including a second storage device,
wherein the second RAID request is distributed to the one or more storage devices based on determining that information in the one or more storage devices corresponding to the first RAID request is to be updated.

18. The method of claim 17,
wherein the distributing of the second RAID request to the one or more storage devices including the second storage device comprises directly transmitting the second RAID request to the second storage device connected to the first storage device in a one-to-one relationship through a direct network connection between the first storage device and second storage device.

19. The method of claim 17,
wherein the first RAID request includes a request for updating old data stored in the first storage device into new data, and the second RAID request includes a request for updating a parity of the second storage device.

20. The method of claim 19, further comprising:
recovering data of the first storage device using the updated parity from the second storage device.

* * * * *